United States Patent [19]

Hansson

[11] Patent Number: 5,096,649
[45] Date of Patent: Mar. 17, 1992

[54] METHOD OF PRODUCING INTEGRAL ARTICLES

[75] Inventor: Jan Hansson, Linköping, Sweden

[73] Assignee: Saab-Scania Aktiebolag, Linkoping, Sweden

[21] Appl. No.: 623,736

[22] PCT Filed: Jun. 15, 1989

[86] PCT No.: PCT/SE89/00339

§ 371 Date: Dec. 17, 1990

§ 102(e) Date: Dec. 17, 1990

[87] PCT Pub. No.: WO90/00111

PCT Pub. Date: Jan. 11, 1990

[30] Foreign Application Priority Data

Jul. 4, 1988 [SE] Sweden ............................... 8802499

[51] Int. Cl.$^5$ ........................ B29C 43/10; B29C 43/30
[52] U.S. Cl. ............................ 264/258; 264/257; 264/320
[58] Field of Search ................... 264/258, 257, 320

[56] References Cited

U.S. PATENT DOCUMENTS

| | | | |
|---|---|---|---|
| 1,284,706 | 11/1918 | Kempton | 264/258 |
| 4,294,639 | 10/1981 | Woelfel et al. | 264/258 |
| 4,388,263 | 6/1983 | Prunty | 264/257 |
| 4,492,607 | 1/1985 | Halcomb | 156/249 |
| 4,636,344 | 1/1987 | McDougall | 264/258 |
| 4,769,197 | 9/1988 | Kromrey | 264/258 |
| 4,937,032 | 6/1990 | Krone et al. | 264/258 |

*Primary Examiner*—James Lowe
*Attorney, Agent, or Firm*—Lowe, Price, LeBlanc & Becker

[57] ABSTRACT

A method of producing integral articles such as rudder parts etc. of plastics, reinforced with relatively long, continuous fibres is described. During the hot-setting or thermoforming process pressure is applied along at least two co-ordinate axes, with an angle between them of 30° to 90°. The method is characterized particularly in that to achieve the required pressures for each co-ordinate axis, from one of its co-ordinate directions a pressure element movable relative to the article is pressed against the article, while from the opposite co-ordinate axis at least one principally form stable reaction block or element in conjunction with said pressure element is caused to provide a pressure that acts on the article and against the direction of the force of the pressure element.

4 Claims, 2 Drawing Sheets

METHOD OF PRODUCING INTEGRAL ARTICLES

The present invention relates to a method of producing integral articles of hot-setting resins or thermoplasts reinforced with relatively long fibres so called composites, whereby during the hot-selling or thermoforming process pressure is applied along at least two co-ordinate axes between which the angle is 30° to 90°.

Such fibre-reinforced plastics, i.e. composites, are used for the manufacturing of articles, whereby in the aircraft industry methods with increased air pressure i.e. autoclaves are usually used, and in other industries usually presses. Originally in manufacturing more complicated articles of composite material simpler parts were made separately and then put together to the desired article by means of gluing or mechanical joints. Regarding pure plastics and plastics reinforced with short fibres development has gone far in integrating form and function. This has been possible in that such material can float a long way in complicated closed tool moulds. For composites with relatively long, continuous fibres this possibility does not exist.

Articles that are intended to be manufactured according to the aforementioned method comprise for instance integrally set stiffeners in panels or integrally set ribs, spars and crusts in rudders. Hitherto, the required pressure has been attained for the manufacturing of the last-mentioned articles with the aid of double tools and with deformable reaction blocks or elements in the form of silicone inserts whereby the pressure has been attained in autoclave or through the thermal expansion of the silicone.

These hitherto known methods of manufacturing have not been entirely satisfactory in the manufacturing of integral articles, particularly not regarding such articles that have a relatively complicated form and/or articles on which there are extremely high demands on strength combined with low weight.

The object of the present invention is therefore to provide a method as mentioned in the introduction that admits a relatively simple and reliable method of manufacturing integral articles on which are placed the aforementioned demands.

According to the invention such a method is characterized primarily in that in order to attain the required pressures for each coordinate axis a pressure element movable relative to the article is pressed against the article from one co-ordinate direction, while from the opposite co-ordinate direction at least one principally form stable or rigid reaction block or element in conjunction with said pressure element is caused to provide a pressure that acts on the article and against the direction of the force of the pressure element.

In an appropriate embodiment of the invention the heal required for the hot-selling or thermoforming process is supplied at least partly via the reaction block or element.

There are also applications of the invention where it is advantageous that in addition to the rigid reaction blocks or elements, a deformable reaction block or element, such as a silicone insert, in conjunction with said pressure element is caused to provide a pressure that acts on the article and against the direction of the force of the pressure element.

Some articles have such an internal form that the bucker-up element must be separable so that it can be put in and out of the required working position.

The invention will now be described in detail, with reference to the accompanying drawings, in which

BRIEF DESCRIPTION OF THE DRAWINGS

FIG. 4 shows a vertical longitudinal section through a portion of another rudder (on a larger scale compared with FIGS. 1-3), with reaction blocks or elements positioned for the application of the method according to the invention; whereas

DESCRIPTION OF THE PREFERRED EMBODIMENTS

Figure 1:
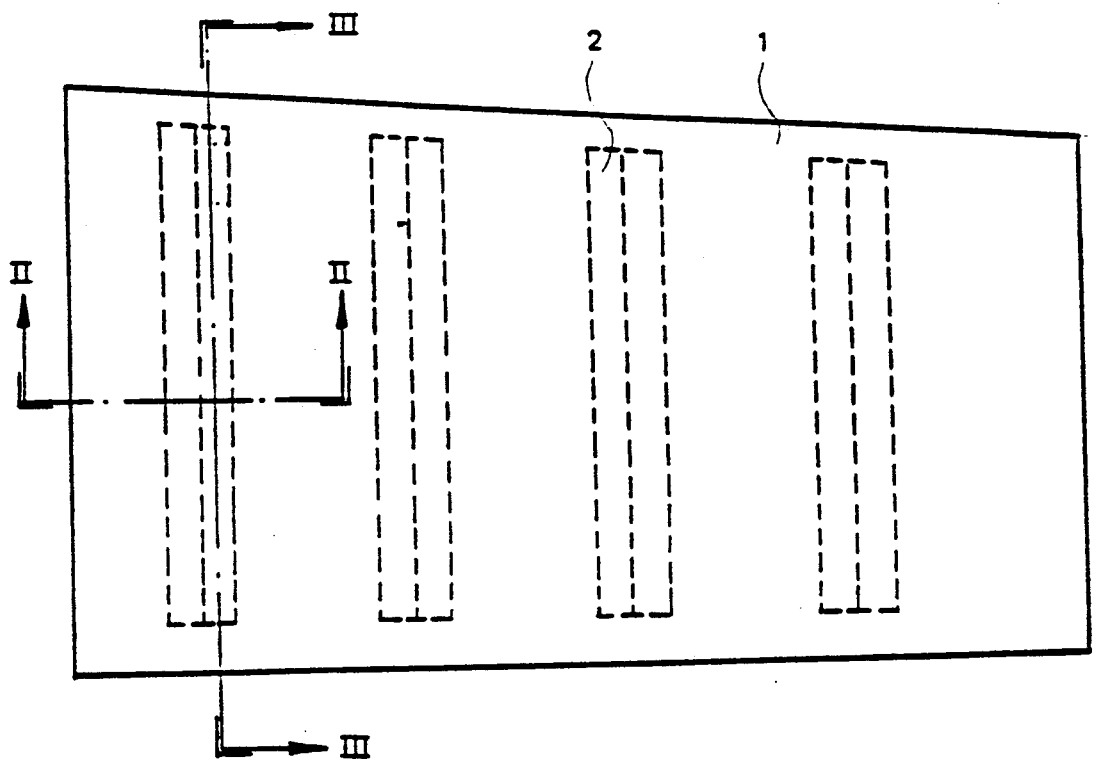
FIG. 1 shows a view of part of an aircraft rudder with suggested ribs.
Figure 2:
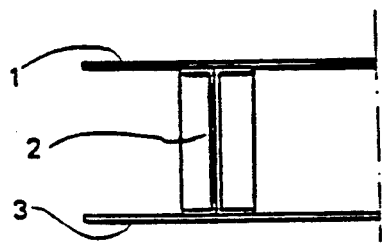
FIG. 2 shows a cross-section along the marks II—II in FIG. 1.
Figure 3:
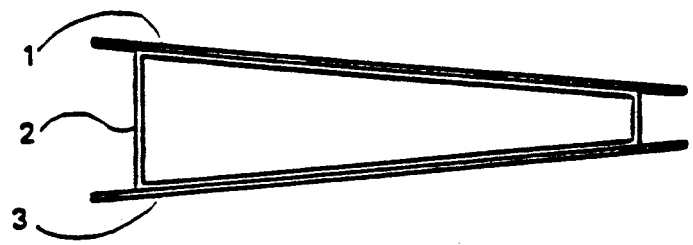
FIG. 3 shows a cross-section along the markings III—III in FIG. 1.

In FIG. 1-3 the upper composite crust or skin of the rudder part is designated by 1, composite ribs by 2 and a lower composite crust or skin by 3.

Figure 4:
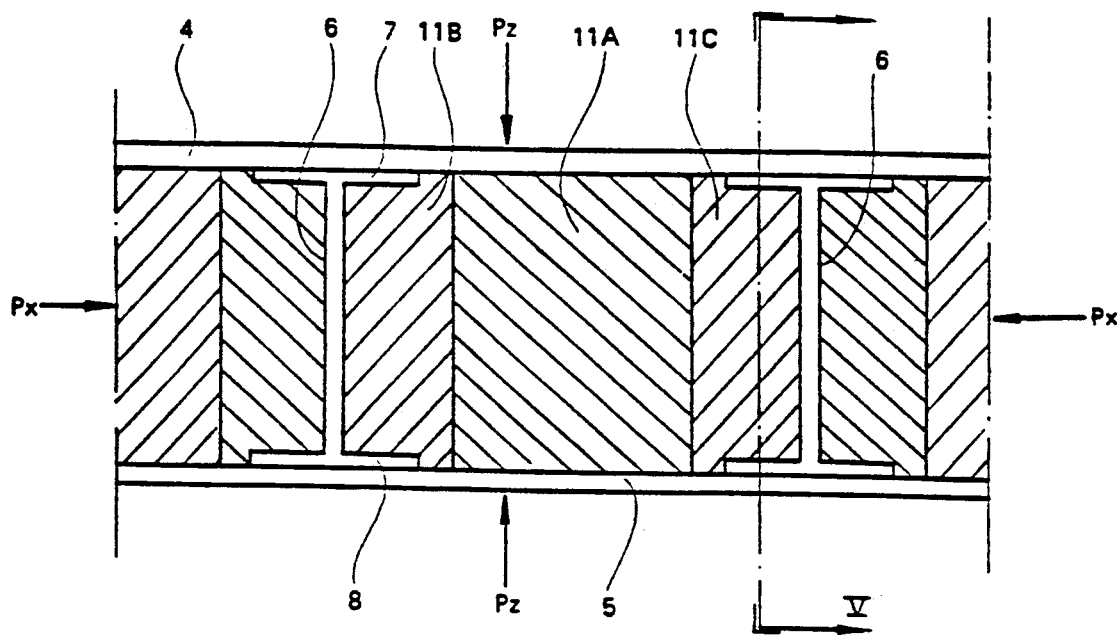
Figure 5:
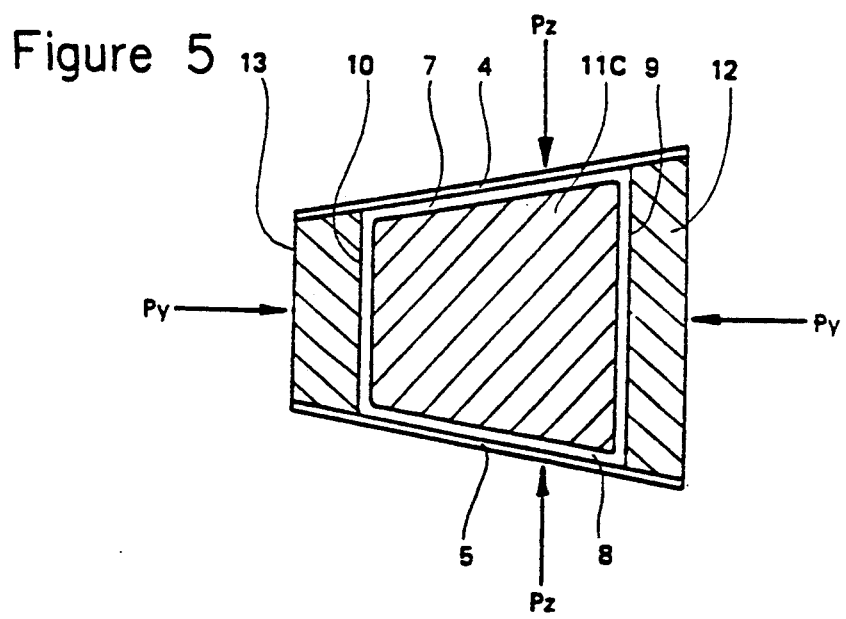
FIG. 5 shows a cross-section along the markings V—V in FIG. 4.

In FIG. 4, 4 designates an upper composite crust, 5 a lower composite skin and 6 composite ribs. These are provided partly with upper and lower flanges 7, 8 for attachment to the composite site skins 4, 5 and partly with essentially vertical front and rear coupling flanges 9, 10 to be connected to spars, which are not shown.

The rudder parts that are shown are in this case built of hot-selling resins, reinforced with relatively long continuous fibres, for example of glass.

Each rigid reaction block or element of aluminium is divided into three, and is designated by 11a, 11b and 11c. This trisecting is necessary for the reaction block to be capable of being placed in working position and taken out of such a position, because the coupling flanges 9, 10 prevent the positioning of a reaction block in one single piece. Therefore the reaction block parts 11b and 11c are firstly set in position whereupon the center reaction block part 11a is pushed in. Then the reaction block or elements 12 and 13 are arranged working from the outside on the vertical coupling flanges 9 and 10.

The required pressure is so built up by means of a pressing tool in the order Px, Py and Pz according to the figures, whereupon the setting process is started, in this case through the supply of heat from the outside. As has already been mentioned the reaction blocks or elements can also be provided with healing arrangements to facilitate a steady temperature distribution during the selling process. When this is done the pressure is removed and the reaction blocks or elements are taken out in the order 11a, 11b and 11c.

I claim:

1. A method of producing integral articles of hot-setting resins or thermoplasts reinforced with relatively long fibers, so called composites, whereby during the hot-setting or thermoforming process, pressure is applied along at least two co-ordinate axes, whereby the angle between the axes is 30°-90°, characterized in that in order to attain the required pressures for each co-ordinate axis from one co-ordinate direction, a pressure element movable relative to the article is pressed against the article, while from the opposite co-ordinate direction multiple substantially rigid reaction elements in conjunction with said pressure element are caused to provide a pressure that acts substantially rigidly through said reaction elements against the direction of the force of the pressure element.

2. A method according to claim 1 wherein multiple substantially rigid reaction elements are removably disposed between spaced portions of said article to provide substantially rigid reactance against the force of the pressure element.

3. A method according to claim 1 wherein the pressure along said coordinate direction is solely externally applied.

4. A method according to claim 1 wherein said multiple substantially rigid reaction elements provide a rigid transfer of pressure serially through said elements to internal surfaces of said article.

* * * * *